UNITED STATES PATENT OFFICE.

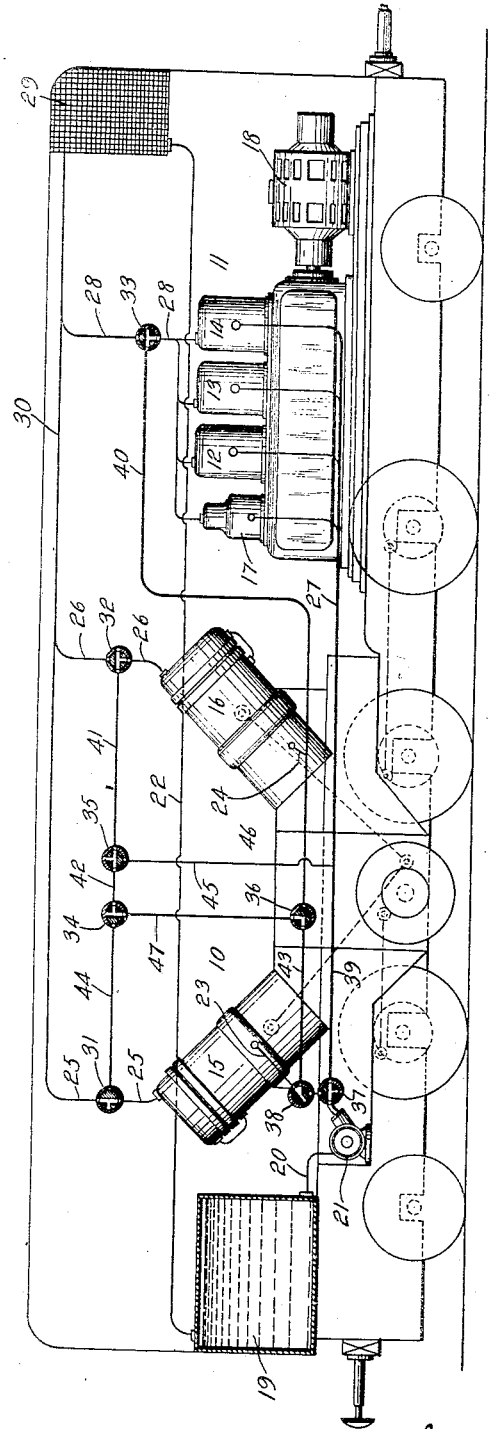

JAKOB MÜLLER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

WATER-COOLING SYSTEM FOR COMBUSTION-ENGINES.

1,176,309.  Specification of Letters Patent.  Patented Mar. 21, 1916.

Application filed April 3, 1913. Serial No. 758,653.

*To all whom it may concern:*

Be it known that I, JAKOB MÜLLER, engineer, a citizen of the Republic of Switzerland, and residing at Winterthur, Canton of Zurich, Switzerland, have invented the following described new and useful Improvements in Water-Cooling Systems for Combustion-Engines.

This invention relates to the water-cooling of internal combustion engines, especially on vehicles and vessels, and consists in a circulatory system common to two or more engines or power groups and including provisions whereby the course of the cooling fluid can be controlled at will.

The object of the invention is to enable the cooling fluid to be used in the most economical way, this being a matter of importance on vehicles where the amount of cooling water that can be carried is limited and also on vessels which may operate in water unsuitable for engine cooling, to enable the character of the circulation to be changed in accordance with different conditions or the special end in view, and to make it possible to cut one or more of the engines or parts entirely out of the circuit.

The accompanying drawing illustrates semi-diagrammatically an embodiment of the invention as applied to a locomotive.

In this application of the invention two engines or power groups are shown, the one, designated 10, being the engine that drives the vehicle, and the other, designated 11, being an auxiliary engine, which may be used for producing compressed air for braking and for injecting fuel into its own power cylinders 12, 13, 14, and into the cylinders 15, 16, of the main engine, and also for water delivery and electric light and power. It is shown as including a multi-stage air compressor 17, which may be of the construction well known in connection with Diesel engines, and as driving an electric generator 18. The engines may be Diesel engines or of other suitable type.

Both engines are included in a common circulatory system, having a reservoir 19 for holding the greater part of the cooling medium. From this vessel the water passes through a main supply pipe 20, and is caused to circulate by the impelling action of a pump 21. A variety of courses for its flow are provided by a system of piping and valves, whereby the water after passing through the cooling spaces of one or more of the motors or power units, that is to say, their cylinders, water-jackets, cylinder-heads, pistons, etc., is conducted to the inflow pipes of the other motor or cylinders, before reaching the main return pipe 22, or whereby the fluid may be circulated in a plurality of paths through the spaces of the different engines connected as it were in parallel, or through part of the spaces or one of the engines to the exclusion of the remainder.

The inflow pipes of the main engine cylinders 15 and 16 are indicated at 23, 24. The water thus admitted flows through the water-jackets in the cylinders and cylinder heads, and may also flow through the pistons, in accordance with well known internal combustion engine construction, and makes its exit through the outflow pipes 25, 26. The cooling spaces of the power and compressor cylinders, 12, 13, 14 and 17, are shown as having a common inflow pipe 27, with branches leading to the several cylinders, and outflow branches uniting into a common outflow pipe 28. At a suitable place on the vehicle is a radiator or apparatus 29 for extracting the heat from the water, one radiator being preferably employed for the system, though there might be two or more connected at different points. The several outflow pipes join into a main outflow pipe 30 leading to this radiator, and from the radiator the main return pipe 22 leads back to the reservoir.

Valves 31, 32, 33, of the character indicated, control the several outflow pipes 25, 26 and 28. By means of these organs the respective engines or cylinders can be connected with or cut off from the return side of the main circuit; or by suitable setting of these valves, in conjunction with valves 34, 35, 36, the outflow of one or more of the parts may be directed to the inflow pipes of certain of the other parts to be cooled. Valves 37, 38, and also valve 36, having passages as indicated, serve to control the distribution of fluid to the various inflow pipes. It will be understood of course that the specific arrangement of valves and piping may be considerably varied. As the simplest mode of describing the arrangement shown, certain of the possible paths for circulation of the fluid will be indicated.

According to the valve setting shown, the liquid passes from main supply pipe 20 and pump 21 through the valve 37 to pipe 39 and thence to the inflow pipe 27 of the auxiliary engine 11. With the valve 33 set as shown, the outflow from this engine cannot pass to the radiator 29, but is directed through pipe 40 to inflow pipe 24 of main engine cylinder 16. Valve 36 being set as shown all the flow passes through the spaces of this cylinder, and through its outflow pipe 26. The valve 32 controlling this pipe does not permit the fluid to pass to the radiator and thence to the main return pipe, at this time, but directs it into the pipe 41, from which it flows through valve 35, in the position shown to pipe section 42, and thence by way of valve 34 to pipe 47, and through valve 36 to pipe 43, and thence by way of valve 38 to the inflow pipe 23 of main engine cylinder 15. From the outflow pipe 25 of this cylinder the water flows past the valve 31 to the pipe 30 leading to the radiator, whence it finally returns by pipe 22 to the reservoir.

Another mode of circulating the fluid is as follows, the valves being set in the obvious appropriate manner: from the main supply pipe 20 and pump 21, through the valve 37, which is turned to cut off the pipe 39, to the valve 38, which is turned so as to cut off the pipe 43, and to direct the flow to the cooling spaces of the main engine clyinder 15, thence by way of outflow pipe 25 and valve 31 to pipe 44, through valve 34, to pipe section 42, thence through valve 35 to pipe 45, thence to the inflow pipe 27 of the auxiliary engine, thence by way of the outflow pipe 28 and valve 33 to pipe 40, leading to inflow pipe 24 of main engine cylinder 16, from which the water passes by way of outflow pipe 26 and valve 32 to the pipe 30 and thence to the radiator, whence it finally returns to the reservoir. By an appropriate setting of the valves the fluid can be caused to pass first through the cooling spaces of the main engine cylinder 15, thence by way of pipe 25, valve 31, pipe 44, valve 34, pipe 47, valve 36, pipes 46 and 24, to and through the spaces of main engine cylinder 16. From the outflow pipe 26 of this cylinder the flow can be caused to pass by way of valve 32 and pipe 30 to radiator 29, and thence back to the reservoir, the auxiliary engine being cut out of circuit; or, the valve 32 being appropriately turned, the liquid after passing through the spaces of the main engine cylinders 15, 16, in the manner just described, may be caused to flow by way of pipe 41, valve 35, and pipes 45, 27, to the cooling spaces of the auxiliary engine, which are thus placed in series with the main engine, thence passing to the radiator and to the return side of the system. The manner of causing the fluid to flow first through the cooling spaces of the auxiliary engine and thence through those of the main engine before reaching the main return pipe has already been described; and it will be clear that by turning the valve 33 the main engine can be cut out of the circuit, and the medium be caused to pass direct from the auxiliary engine to the radiator and thence to the return pipe 22. Furthermore, the engines can be connected in parallel. For this purpose the valve 37 adjacent the pump 21 is appropriately turned so that the flow divides, part passing to the valve 38 and thence to and through the cooling spaces of the main engine, and the other part passing by way of pipes 39, 27, to the auxiliary engine. The heated fluid passing from both engines is reunited in the pipe 30, passes to the radiator and thence back to the reservoir. The portion of the flow that passes to the main engine under these conditions flows through the cooling spaces of its cylinders 15 and 16 in succession. However, the part of the fluid that flows through valve 38 can be caused to pass only through the space of cylinder 15 and thence to the return side of the system, the part that flows through valve 37 branching at the junction of pipes 39, 45 and 27, one portion being led to the auxiliary engine and the other portion flowing by way of pipe 45, valve 35, pipe 42, valve 34, pipe 47, valve 36 and pipe 46, to the inflow pipe 24 of the cylinder 16, from which it passes to the common outflow pipe 30 and thence to the radiator and back to the reservoir. Thus, the cooling medium can when desired, be supplied to the cooling spaces of each cylinder without having been previously heated in the spaces of any other cylinder. Conversely, when desirable, the water can be caused to circulate in a more or less heated condition through the spaces of certain cylinders or engines by reason of having previously flowed through the spaces of other cylinders. In this way, in starting, one of the engines may be warmed up by the waste heat of the other.

What is claimed as new is:

1. The combination of two or more internal combustion engines, having cooling spaces and a cooling system therefor including valved connections whereby the cooling medium may be circulated through the cooling spaces of the engines either individually or in series.

2. The combination of two or more multi-cylinder internal combustion engines having cooling spaces and a cooling system therefor including a reservoir, a radiator and valved connections whereby the cooling medium may be circulated through the cooling spaces of either engine and thence back to the reservoir or through the cooling spaces of the engines in series before passing to the radiator.

3. The combination of two or more internal combustion engines having water-cooling spaces and inflow and outflow pipes, a circulatory system including connections between the inflow pipes of one engine and the outflow pipes of the other, and means for cutting one of the engines out of the circulatory system and circulating the cooling mediums only through the spaces of the other.

4. The combination with two or more internal combustion engines or power groups provided with spaces for the circulation of a cooling medium, of a circulatory system and means whereby the spaces of said groups or their members can be connected therewith either in series or in parallel relation, and whereby the groups or their members can be individually cut out of the circuit.

5. The combination of an internal combustion engine having a water jacket, another internal combustion engine, and means for utilizing the waste heat of the second engine to heat the fluid passed through said water jacket so as to warm up the first engine.

6. The combination of two or more internal combustion engines having water jackets, and means for connecting said water jackets in circuit, whereby one engine can be warmed up by the heated cooling water of another.

In testimony whereof, I have signed this specification in the presence of two witnesses.

JAKOB MÜLLER.

Witnesses:
 CARL GUBLER,
 AUGUST RUEGG.